United States Patent [19]

Epstein

[11] 4,020,702
[45] May 3, 1977

[54] REDUNDANT INERTIAL MEASUREMENT SYSTEM CONFIGURATION

[75] Inventor: Michael Epstein, New Milford, N.J.

[73] Assignee: The Bendix Corporation, Teterboro, N.J.

[22] Filed: June 17, 1974

[21] Appl. No.: 480,182

[52] U.S. Cl. .............................................. 74/5.34
[51] Int. Cl.² ...................................... G01C 19/02
[58] Field of Search ..................................... 74/5.34

[56] References Cited

UNITED STATES PATENTS

| | | | |
|---|---|---|---|
| 3,282,119 | 11/1966 | Shaw, Jr. et al. .................. | 74/5.34 |
| 3,477,298 | 11/1969 | Howe ................................. | 74/5.34 |
| 3,489,004 | 1/1970 | Barnhill et al. ................. | 74/5.34 X |
| 3,563,662 | 2/1971 | Wing .............................. | 74/5.34 X |

OTHER PUBLICATIONS

Journal of Spacecraft and Rockets vol. 9, No. 1, Jan. 1972 article entitled "A Redundant Strapdown Inertial Reference Unit (SIRU)" pp. 39-47.

Primary Examiner—Charles J. Myhre
Assistant Examiner—William C. Anderson
Attorney, Agent, or Firm—Anthony F. Cuoco

[57] ABSTRACT

A redundant inertial measuring system includes three strapdown platforms each having two inertial sensors. The sensitive axes of the sensors are discretely disposed relative to the faces of a dodecahedron. The sensors and their associated electronics are physically and electrically separated from each other within each of the platforms.

4 Claims, 3 Drawing Figures

REDUNDANT INERTIAL MEASUREMENT SYSTEM CONFIGURATION

BACKGROUND OF THE INVENTION

1. Field of the Invention

This invention relates generally to redundant inertial measurement systems and, particularly, to systems of the type described wherein inertial sensors are disposed within strapdown platforms. More particularly, this invention relates to a configuration wherein each of the sensors is electrically and physically separated from the other of the sensors within each platform.

2. Description of the Prior Art

In redundant inertial measuring systems, skewing of the input axes of inertial sensors enhances system reliability and failure detection, and isolation of faulty sensors. It has been established that optimum performance results when the skewing is relative to the face of a regular geometric figure, i.e. cube, dodecahedron or icasohedron. A gimballed platform system featuring sensor failure detection and isolation when the sensor axes are disposed relative to the faces of an icasohedron is described in U.S. patent application Ser. No. 240,082, filed Mar. 31, 1972 by B. J. O'Connor, et al, now U.S. Pat. No. 3,918,309 and assigned to The Bendix Corporation, assignee of the present invention.

SUMMARY OF THE INVENTION

The present invention contemplates an inertial measurement system wherein each of three identical strapdown platforms has two inertial sensors disposed therein. The sensor orientation is such that the sensitive axes of the sensors are disposed normal to the faces of a regular dodecahedron and complete electrical and physical separation of each sensor and its associated electronics is featured. Each platform assembly is comprised of two independent compartments with each compartment containing a sensor and associated power supply, rebalancing the scaling electronics modules so that each compartment operates independent of the other and generates a single sensor output. The power supply and rebalance electronics modules are interchangeable between compartments and between sensors to eliminate the need for calibration or adjustments during field maintenance for insuring performance confidence.

One object of this invention is to provide a configuration for a redundant inertial measuring system of the type including three strapdown platforms each having two sensors.

Another object of this invention is to discretely dispose the axes of the sensors normal to the faces of a regular dodecahedron for optimizing failure detection and isolation.

Another object of this invention is to provide the aforenoted configuration wherein each of the sensors within a platform is electrically and physically separated from the other sensors.

Another object of this invention is to provide electronics modules which are interchangeable between the sensors in a platform to facilitate calibration during field maintenance and to insure performance confidence.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

With reference to FIG. 1, platforms 10, 12 and 14 are suitably mounted or strapped down at points 16, 18 and 20 along the X, Y and Z axes, respectively, of a space or similar vehicle. A regular dodecahedron carrying the letter designation D has faces designated by the numerals 1, 2, 3, 4, 5 and 6. Strapdown platform 10 has a pair of inertial sensors such as gyros 22 and 24 suitably secured therein so that input axis 1' of gyro 22 is normal to face 1 of dodecahedron D and input axis 2' of gyro 24 is normal to face 2 of the dodecahedron. Likewise, strapdown platform 12 has a pair of gyros 26 and 28 mounted therein with input axis 3' of gyro 26 normal to face 3 of the dodecahedron and input axis 4' of gyro 28 normal to face 4 thereof. Platform 14 include a pair of gyros 30 and 32 mounted therein with input axis 5' of gyro 30 normal to face 5 of dodecahedron D and input axis 6' of gyro 32 normal to face 6 of the dodecahedron.

With reference to FIG. 2 wherein the internal structure of platform 10 is shown for purposes of illustration, gyros 22 and 24 are shown with their input axes each disposed 31°43'2.9" from the vehicle X axis and normal to faces 1 and 2 of the dodecahedron as shown in FIG. 1. The platform assembly includes two independent compartments separated by a barrier or wall 34. Each compartment, besides containing a gyro 22, 24 contains three electronic modules including a power supply, rebalance electronics and gyro scaling electronics suitably connected to the particular gyro for providing a rate gyro assembly. Thus, the compartment of platform 10 containing gyro 22 contains a power supply module 36, a rebalance module 38 and a gyro scaling module 40. The platform compartment containing gyro 24 likewise contains a power supply module 42, a rebalance module 44 and gyro scaling module 46. In this connection it is noted that rebalance electronics modules 38, 44 may be of the type described in the aforenoted copending U.S. application Ser. No. 240,082 while scaling electronics modules 40,46 may be of the type described in U.S. Pat. No. 3,739,646 issued on June 19, 1973 to Bernard J. O'Connor and Frank S. De Carlo and assigned to The Bendix Corporation, assignee of the present invention. Power supply modules 36 and 42 may be of the conventional regulated type energized, for example, by a signal from a suitable 28 volt d.c. source.

With reference to FIG. 3, power supply 36 energizes gyro 22, scaling electronics 40 and rebalance electronics 38 while power supply 42 energizes gyro 24, rebalance electronics 44 and scaling electronics 46.

Figure 1:
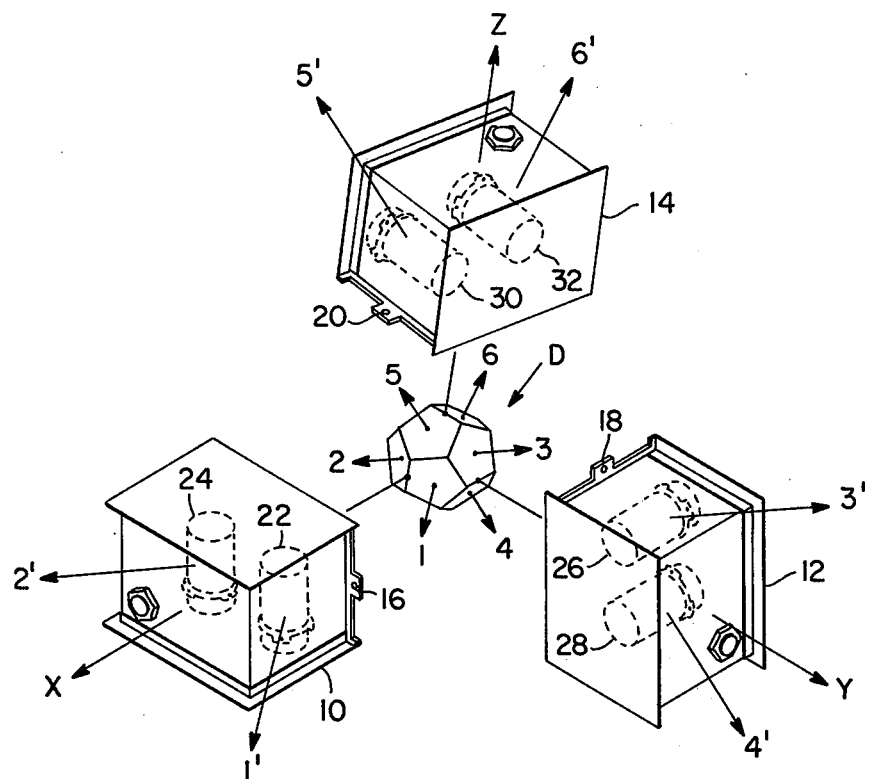
FIG. 1 is a diagrammatic representation showing a redundant inertial measuring system according to the invention and including three strapdown platforms each having two sensors, with the input axes of the sensors discretely disposed normal to the faces of a dodecahedron.
Figure 2:
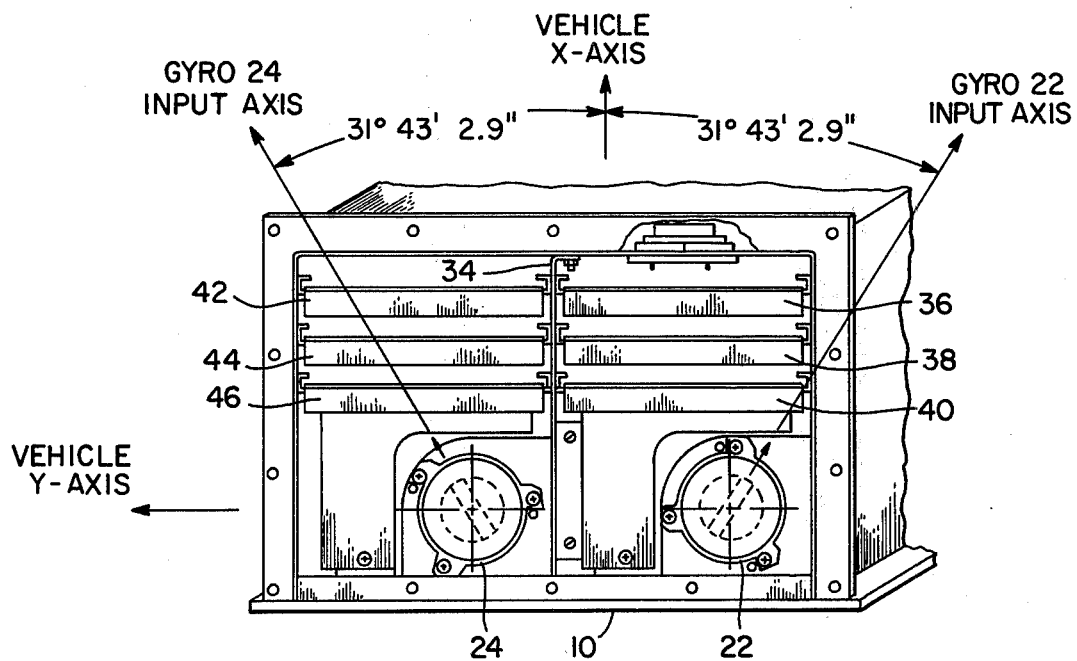
FIG. 2 is a diagrammatic representation showing the internal configuration of a typical platform and illustrating the relative disposition of the sensors and the associated electronic modules therein.
Figure 3:
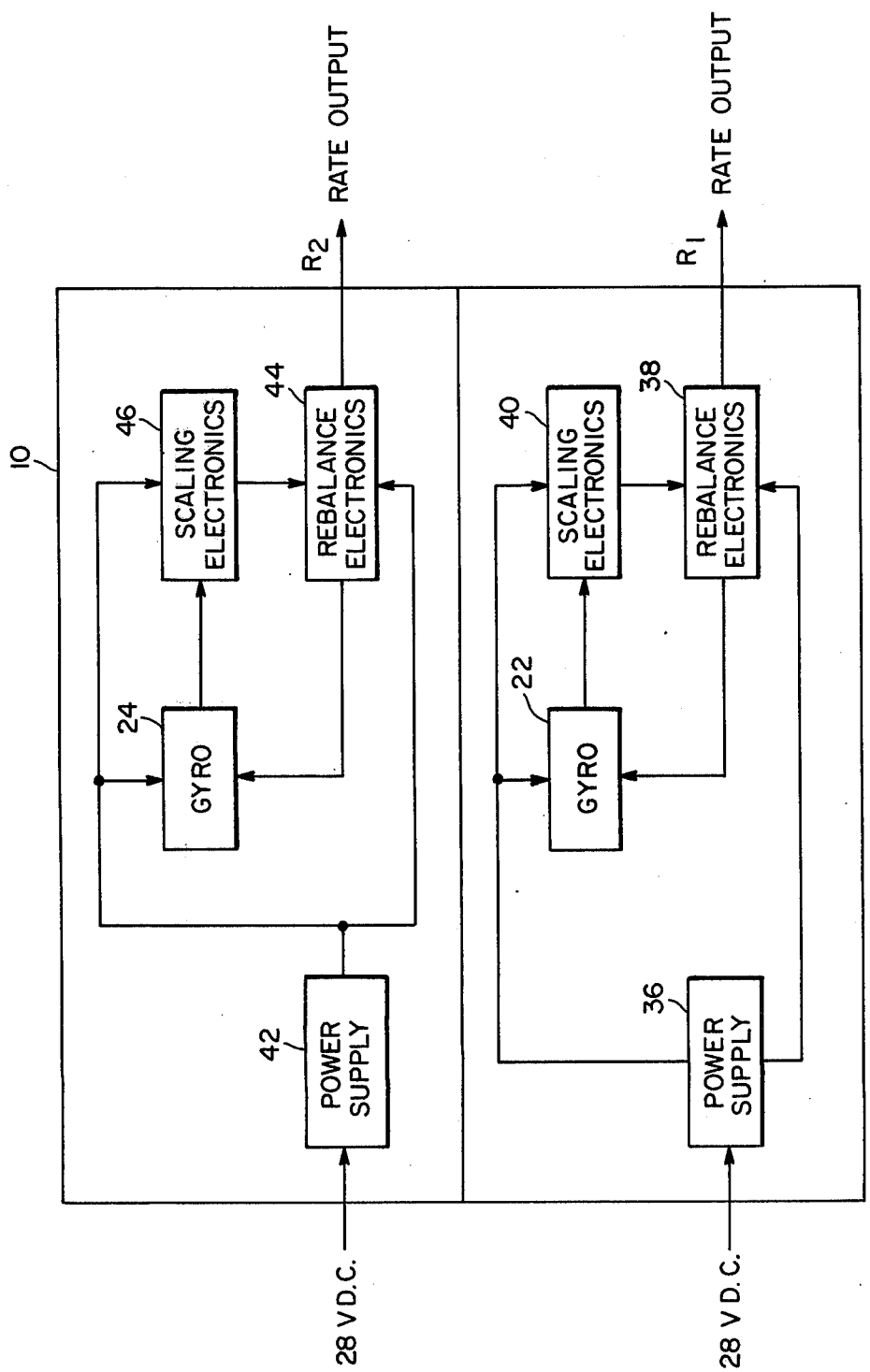
FIG. 3 is a block diagram of a typical platform assembly.

The output from gyro 22 is applied to scaling electronics 40 and the output therefrom is applied to rebalance electronics 38. Rebalance electronics 38 provides an output which is applied to gyro 22 for closing the rebalance loop. Rebalance electronics 38 provides a rate output $R_1$.

The output from gyro 24 is applied to scaling electronics 46 and the output therefrom is applied to rebalance electronics 44. Rebalance electronics 44 provides an output which is applied to gyro 22 for closing the rebalance loop. Rebalance electronics 44 provides a rate output $R_2$.

It will now be seen from the aforenoted description of the invention that the heretofore recited objects have been met. In strapdown redundant inertial measurement systems which require six sensors a configuration is provided wherein three identical platforms each carry two sensors. The sensitive axis of the sensors are disposed relative to the faces of a dodecahedron to enhance failure detection and isolation. Further, with the configuration described complete electrical and physical separation of each sensor and its associated electronics is provided.

Although but a single embodiment of the invention has been illustrated and described in detail, it is to expressly understood that the invention is not limited thereto. Various changes may also be made in the design and arrangement of the parts without departing from the spirit and scope of the invention as the same will now be understood by those skilled in the art.

What is claimed is:

1. A redundant inertial measuring system for a space vehicle comprising:
    three strapdown platforms supported by the vehicle;
    each platform supporting two inertial sensors;
    the sensors being oriented by disposing the sensitive axes thereof substantially normal to the faces of a regular dodecahedron;
    power supply means, rebalancing means and scaling means associated with each of the sensors;
    each of the power supply means exergizing its associated sensor, rebalancing means and scaling means;
    each of the scaling means connected to its associated sensor for scaling the output therefrom; and
    each of the rebalancing means connected to its associated scaling means and sensor and responsive to the scaled output for closing a loop around the sensor and for providing an output independent of the other of the rebalancing means.

2. A redundant inertial measuring system as described by claim 1, wherein:
    each of the platforms has a pair of compartments; and
    each of the compartments contains a sensor and associated power supply means, rebalancing means and scaling means for providing an output independent of the outputs from the other compartments.

3. A redundant inertial measuring system as described by claim 5, wherein:
    the power supply means and the rebalancing means are interchangeable between compartments.

4. A redundant inertial measuring system as described by claim 5, wherein:
    the vehicle has three mutually perpendicular axes, each of which is equiangularly spaced between adjacent normals to the faces of the dodecahedron; and
    each of the platforms is disposed along one of said axes.

* * * * *